United States Patent Office 2,862,356
Patented Dec. 2, 1958

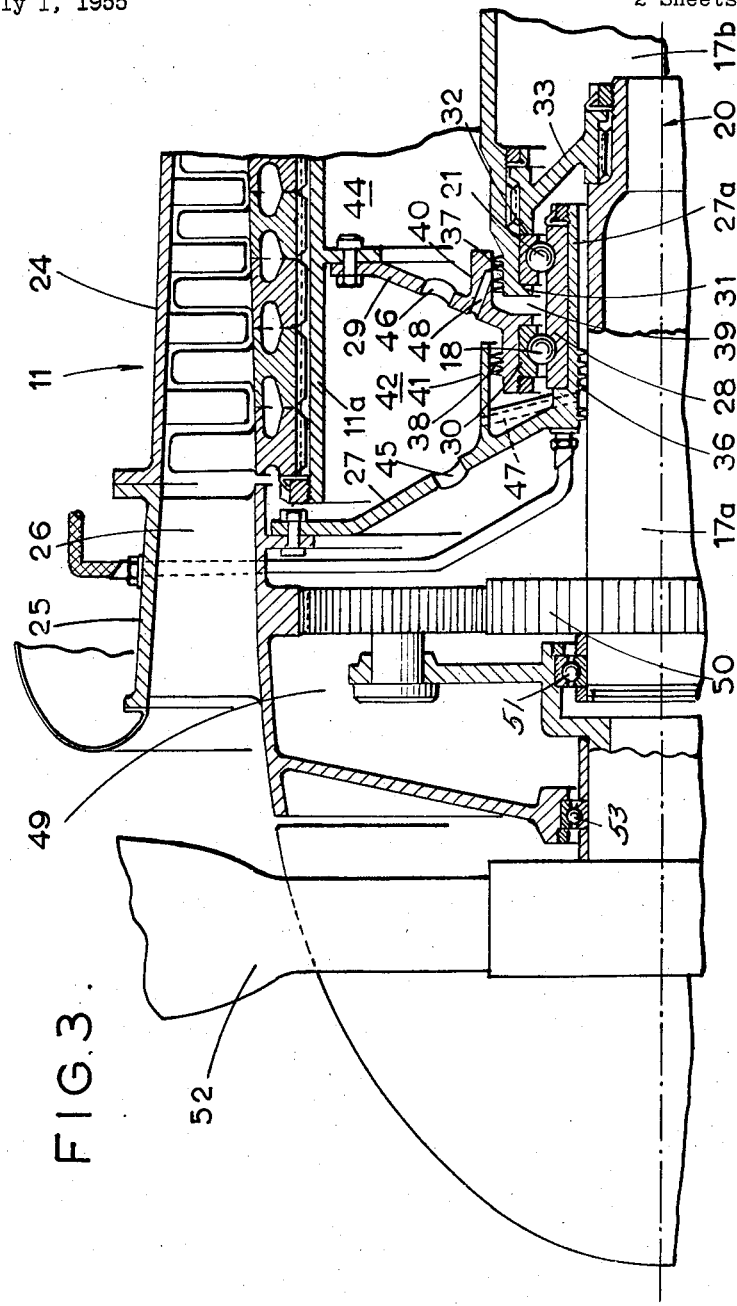

2,862,356

BEARING ARRANGEMENTS FOR GAS-TURBINE ENGINES

Nelson Hector Kent, Allestree, Derby, and Frederick William Walton Morley, Castle Donington, England, assignors to Rolls-Royce Limited, Derby, England, a British company Application July 1, 1955, Serial No. 519,382

Claims priority, application Great Britain July 16, 1954

13 Claims. (Cl. 60—39.16)

This invention relates to gas turbine engines, and relates in particular to such engines of the type having two independently-rotatable concentric rotors.

Such a gas turbine is hereinafter called a gas turbine of the type referred to.

One example of such engines is an engine of the compound type, that is, an engine having at least a low-pressure compressor and a high-pressure compressor in series, the low-pressure compressor being driven by a low-pressure turbine and the high-pressure compressor by a high-pressure turbine, and the low pressure compressor/turbine rotor being rotatable independently of the high-pressure compressor/turbine rotor. A compound engine may include three or more compressors in series each driven by an associated turbine. Where the engine is an open cycle engine, as is usual for example for aircraft propulsion, the low-pressure compressor will draw in air from atmosphere, and the air after compression in the high-pressure compressor will have fuel burnt in it in combustion equipment, the products of combustion being expanded through the turbines to drive them and passing finally to atmosphere.

Another example of such engines is an engine having a free power turbine driving a propeller; such a propeller-turbine engine will have at least one compressor, the air after compression having fuel burnt in it in combustion equipment, the products of combustion being expanded through at least one compressor-driving turbine and the power turbine and passing finally to atmosphere. Where the engine comprises only one compressor the power turbine will usually be on the downstream side of the compressor-driving turbine; in this case the compressor turbine rotor may be hollow and a shaft through which the power turbine drives the propeller may pass coaxially through it. Such a shaft and power turbine is included within the term "rotor." Where the engine comprises a number of compressor-driving turbines, the power turbine is preferably between two of them or downstream of them.

According to the present invention, in a gas-turbine engine of the type referred to, a bearing of each of a pair of adjacent rotors is carried by a common part of the stationary structure of the engine, the outer member of each bearing being carried by the respective rotor and the inner member being carried by the stationary structure.

The invention has particular advantage as applied to rolling bearings that is to say ball and roller bearings, and according to a feature of the invention each of said pair of adjacent rotors is carried by said common part of the stationary structure through a rolling bearing and the outer race of each bearing is carried by the respective rotor and the inner race by the stationary structure.

Adoption of the invention enables the part of the rotor adjacent the bearing to be of larger diameter for a given size of a bearing than with the more usual arrangement where the outer member of the bearing is carried by the stationary structure and the inner member by the rotor. It is advantageous to make the rotor shaft of large diameter to avoid whirling of the shaft.

It is usual in a compound gas turbine engine for the low-pressure compressor and turbine rotors to be interconnected by a shaft which is concentrically within the high-pressure compressor and turbine rotors (or within intermediate-pressure compressor and turbine rotors where there are more than two compressors), and thus according to another feature of the invention a bearing supporting the shaft means interconnecting a compressor rotor and a turbine rotor of the engine, and a bearing supporting the rotor of the next adjacent compressor downstream of said last-mentioned compressor are carried by a common part of the stationary structure of the engine which is itself supported by structure extending across the working fluid passage of the engine between the two compressors.

According to yet another feature of the invention, said shaft means passes through the common part of the stationary structure, and has a reentrant portion which carries the outer race of its supporting bearing, and the bearing supporting the rotor of the next adjacent compressor downstream is on the upstream side of the bearing carried by the reentrant portion.

According to yet a further feature of the invention, the bearings carried by the common part of the stationary structure are ball thrust bearings one for each of the pair of compressor/turbine rotors, and the rotors are additionally supported by journal roller bearings.

Likewise it is usual, in an engine having a free power turbine driving propeller, for the propeller and power turbine rotor to be interconnected by shaft means which is concentrically within a compressor/turbine rotor, and thus according to another feature of the invention a bearing supporting the shaft means connected to the power turbine rotor, and a bearing supporting the rotor of the compressor immediately surrounding said power turbine shaft means are carried by a common part of the stationary structure of the engine which is itself supported by structure extending across the working fluid passage of the engine upstream of said compressor.

Two embodiments of gas turbine engine will now be described by way of example with reference to the accompanying drawings, of which:

Figure 3 shows the application of the invention to an engine in which a free power turbine drives a propeller.

Figure 1:
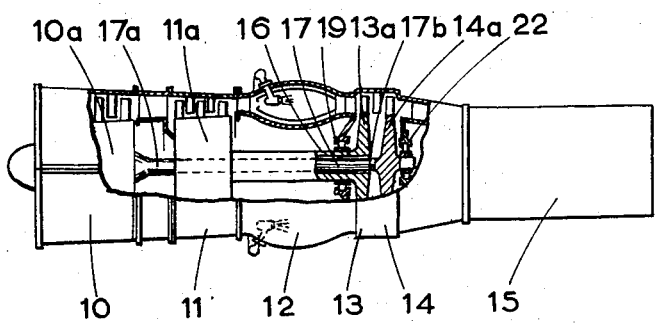
Figure 1 shows diagrammatically a compound gas turbine engine.

Referring first to Figure 1, the engine comprises a low-pressure compressor 10 which draws in air from atmosphere and delivers it to a high-pressure compressor 11, whence it is delivered to combustion equipment 12 where fuel is burnt in it. From the combustion equipment the products of combustion expand through a high-pressure turbine 13 and then through a low-pressure turbine 14, and are eventually exhausted to atmosphere as a propulsive jet through a jet pipe 15 having a propulsive nozzle at its outlet.

The rotor 13a of the high-pressure turbine is connected by a shaft 16 to the rotor 11a of the high-pressure compressor, the parts 13a, 16, 11a being referred to for convenience as the high-pressure compressor/turbine rotor, and likewise the rotor 14a of the low-pressure turbine is connected by a shaft 17 to the rotor 10a of the low-pressure compressor, the parts 14a, 17, 10a being referred to as the low-pressure compressor/turbine rotor. The shaft 17 passes through the center of the high-pressure compressor/turbine rotor, which is hollow.

Shaft 16 is rigid, and the high-pressure compressor/ turbine rotor is supported in the stationary structure by two bearings, a ball thrust bearing 18 near its upstream end (see Figure 2) and a roller bearing 19 near the turbine 13.

Shaft 17 on the other hand is in two parts 17a, 17b, connected by a joint 20 (Figure 2) which permits a limited degree of universal angular freedom, and the low-pressure compressor/turbine rotor is supported in the stationary structure by three bearings, a journal bearing (not shown) at the inlet end of the low-pressure compressor, a ball-bearing 21 near the joint 20, and a roller bearing 22 near the turbine 14.

Figure 2:
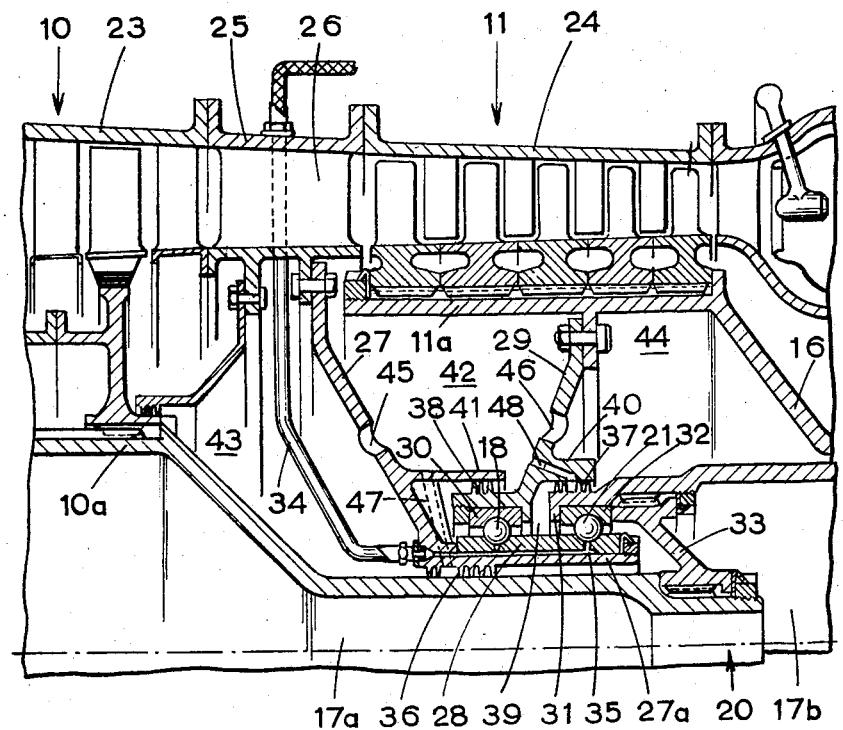
Figure 2 shows in greater detail a bearing arrangement of the engine.

Referring now to Figure 2, each compressor 10, 11 comprises as is usual a stator casing 23, 24, respectively, the stator casings 23, 24 being interconnected by a duct member 25 through which air delivered by the low-pressure compressor 10 flows to the inlet of the high-pressure compressor 11, and forming a main structural part of the engine. The duct member 25 includes streamlined struts 26 which extend across the working fluid passage, and carries within it bearing supporting structure 27 shown as a casing member of frusto-conical form having at its inner end a cylindrical part 27a on which is secured a common inner race 28 of bearings 18, 21.

The bearing 18 of the high-pressure compressor/turbine rotor 13a, 16, 11a is located on the upstream side of the bearing 21, and supports the rotor 13a, 16, 11a through a frusto-conical stubshaft member 29 within the bore of which is secured the outer race 30 of the bearing 18.

The downstream part 17b of the shaft 17 interconnecting the low-pressure compressor and turbine rotors is formed at its upstream end with an inwardly-turned flange 31, and the outer race 32 of the bearing 21 is secured within the shaft in abutment with the flange.

Forming part of the joint 20 between the parts 17a, 17b of the shaft is a coupling member 33 which engages with external splines on part 17a and with internal splines on part 17b, so that torque may be transmitted from one shaft to the other, and the arrangement is such as to provide a degree of universal angular freedom between the shaft parts 17a, 17b. The upstream end of shaft part 17b overlaps the downstream end of part 17a, thus forming a reentrant portion of the shaft which carries the race 32; the bearing 21 surrounds the downstream end of the part 17a.

Lubricating oil is supplied to bearings 18, 21 through a pipe 34, which extends through one of the struts 26, through a groove 35 in the bore of race 28, and through connecting drillings.

Three seals 36, 37, 38 separate the chamber 39 in which the bearings are situated from the surrounding spaces, the seal 36 comprising an internal labyrinth member on the part 27a of the casing 27 and a co-operating cylindrical surface on the shaft part 17a, the seal 37 comprising an external labyrinth member on the shaft part 17b and a co-operating bore formed within a flange 40 on the stubshaft member 29, and the seal 38 comprising an external labyrinth member on the stubshaft member 29 and a co-operating bore within a flange 41 extending from the frusto-conical part of casing 27.

The space 42 between the casing 27 and the frusto-conical stubshaft member 29 is at a higher pressure than the space 43 on the upstream side of the casing 27 and the space 44 between the shafts 16, 17b, and consequently there is a flow of air from the space 42 through the hole 45 in casing 27 into space 43 and through hole 46 into space 44.

In order to prevent a flow of air from space 42 through seal 38, chamber 39 and seal 36 to space 43 or through seal 38, chamber 39 and seal 37 to space 44, seals 36, 37 are divided into two sections, and the small chamber between the sections is connected to space 42 through drillings 47, 48 respectively. Drilling 47 is in a boss formed between parts 41 and 27a of casing 27, and drilling 48 is in flange 40 of stubshaft 29. In this way the pressure difference across chamber 39 is minimised and the flow of air through it is effectively prevented.

The engine shown in Fig. 3 has a single compressor 11 to which the duct member 25 affords the intake. The inner wall of the duct member 25 is continued forwardly to form a casing housing, a reduction gear and thrust bearing generally indicated by the reference character 49, for a propeller 52, the shaft of which is mounted in a ball bearing 53 supported in an annular web springing from the inner wall of the duct member 25. The shaft 17a carries at its forward end the high speed pinion 50 of the reduction gear in the form of a sun-wheel of an epicyclic gear train and the forward end of this shaft is carried in a further bearing 51. The pilot wheels of the gear are mounted on a carrier rotatable in bearings 51 and 53 and directly driving the propeller.

What we claim is:

1. A gas turbine engine comprising outer stationary structure defining a working fluid passage; a rotor comprising a compressor, a turbine, and hollow shaft means interconnecting said compressor and turbine whereby said compressor is driven by said turbine; a second independently rotatable rotor comprising a second turbine and second shaft means having an upstream part and a downstream part, said downstream part being connected to said second turbine to transmit power therefrom and extending through said hollow shaft means; stationary structure extending inwardly across the working fluid passage of the engine and carried by said outer stationary structure and having an inner axially-extending portion through which said upstream part of said second shaft means extends; a first bearing mounted on said axially-extending portion and supporting said compressor; a second bearing mounted on said axially-extending portion and surrounded by and supporting said downstream part of said second shaft means, and means forming a driving connection between the upstream part and the downstream part of said second shaft.

2. A gas turbine engine as claimed in claim 1 wherein said second rotor further comprises a second compressor situated upstream of said first compressor and driven by the upstream part of said second shaft means.

3. A gas turbine engine as claimed in claim 1 wherein said second rotor further comprises a propeller situated upstream of said first compressor, reduction gear means driving said propeller and connected to the upstream part of said second shaft means to be driven by said second turbine.

4. A gas turbine engine as claimed in claim 1 in which each of said rotors is carried on said axially-extending portion of the stationary structure through a rolling bearing, the outer race of each bearing being carried by the respective rotor and the inner race by the axially-extending portion of the stationary structure.

5. A gas turbine engine as claimed in claim 1 said rotors being supported on ball thrust bearings from said inner axially-extending portion of said stationary structure and journal roller bearings elsewhere on said stationary structure further supporting said rotors.

6. A gas turbine engine as claimed in claim 5 in which said ball thrust bearings have a common inner race member.

7. A gas turbine engine as claimed in claim 1 in which the bearings on said inner axially-extending portion of the stationary structure are lubricated by a pipe introduced through said structure extending across the working fluid passage of the engine.

8. A gas turbine engine as claimed in claim 2 in which the upstream part of said second shaft means passes through the inner axially-extending portion of the stationary structure and has a reentrant portion which carries the outer race of its supporting bearing, and the bearing supporting the rotor of the next adjacent compressor downstream is on the upstream side of the bearing carried by the reentrant portion.

9. A gas turbine engine as claimed in claim 1 which incorporates a truncated cone-shaped stub shaft supporting the outer rotor from the most upstream of said two bearings.

10. A gas turbine engine as claimed in claim 3 in which said second shaft means passes through the inner axially-extending portion of the stationary structure and has a reentrant portion which carries the outer race of its supporting bearing, and the bearing supporting the rotor of said compressor rotor turbine is on the upstream side of the bearing carried by the reentrant portion.

11. A gas turbine engine as claimed in claim 3 which incorporates a truncated cone-shaped stub shaft supporting said compressor turbine rotor from the most upstream of said two bearings.

12. A gas turbine engine as claimed in claim 1 which incorporates labyrinth seals positioned to seal off the space housing the said bearings on said axially-extending portion of said stationary structure from parts of the surrounding space in which there are gases at different pressures.

13. A gas turbine engine as claimed in claim 12 in which at least one of said labyrinth seals is made in two parts with a space between the parts, and means connecting said seal space connected to a part of the surrounding space which is at a higher gas pressure than said housing space.

References Cited in the file of this patent

UNITED STATES PATENTS 2,426,098    Heppner _____ Aug. 19, 1947